United States Patent
Lanza et al.

(10) Patent No.: US 9,519,078 B2
(45) Date of Patent: Dec. 13, 2016

(54) DEVICE FOR CHECKING THE CALIBRATION OF CATCHING INSTRUMENTS MEASURING RAINFALL INTENSITY

(75) Inventors: Luca Giovanni Lanza, Genoa (IT); Luigi Stagi, Genoa (IT)

(73) Assignee: UNIVERSITA' DEGLI STUDI DI GENOVA, Genoa (IT)

( * ) Notice: Subject to any disclaimer, the term of this patent is extended or adjusted under 35 U.S.C. 154(b) by 185 days.

(21) Appl. No.: 14/129,989

(22) PCT Filed: Jun. 28, 2012

(86) PCT No.: PCT/IB2012/053303
§ 371 (c)(1),
(2), (4) Date: Dec. 29, 2013

(87) PCT Pub. No.: WO2013/001495
PCT Pub. Date: Jan. 3, 2013

(65) Prior Publication Data
US 2014/0137632 A1    May 22, 2014

(30) Foreign Application Priority Data

Jun. 30, 2011    (IT) .............................. GE2011A0068

(51) Int. Cl.
*G01W 1/18*    (2006.01)
*G01F 25/00*    (2006.01)
*G01W 1/14*    (2006.01)

(52) U.S. Cl.
CPC ............ *G01W 1/18* (2013.01); *G01F 25/0061* (2013.01); *G01W 1/14* (2013.01)

(58) Field of Classification Search
USPC ........................................................ 73/426
See application file for complete search history.

(56) References Cited

U.S. PATENT DOCUMENTS

| 1,581,176 | A | * | 4/1926 | Cook | ........................ F24H 9/06 |
| | | | | | 126/363.1 |
| 4,213,337 | A | * | 7/1980 | Langdon | ............... G01F 23/296 |
| | | | | | 340/621 |

(Continued)

OTHER PUBLICATIONS

International Search report dated Nov. 27, 2012.
(Continued)

*Primary Examiner* — Hezron E Williams
*Assistant Examiner* — Mark A Shabman
(74) *Attorney, Agent, or Firm* — Hedman & Costigan, P.C.; James V. Costigan; Kathleen A. Costigan

(57) ABSTRACT

Device (1) for checking the calibration of catching instruments measuring rainfall intensity, which comprises a plurality of containers (2a, 2b, 2c) having a predetermined internal volume (V1, V2, V3), the volume of at least two of said containers being different from each other, said containers being intended to contain respective amounts of a liquid, wherein each container (2a, 2b, 2c) is provided with a single exhaust nozzle (3a, 3b, 3c) intended to put the internal volume (V1, V2, V3) of said container (2a, 2b, 2c) in fluid communication with an outer environment such to allow said liquid discharged from said nozzle (3a, 3b, 3c) to flow out by gravity in a substantially horizontal direction, each one of said containers (2a, 2b, 2c) further comprising air intake means (4a, 4b, 4c) intended to put the internal volume (V1, V2, V3) in fluid communication with the outer environment in order to define a compensation of the air pressure inside the container, such to make piezometric head constant at the height of said nozzle (3a, 3b, 3c) independently of the change of the liquid level in said container (2a, 2b, 2c) during its emptying, such to obtain a contemporaneous check of the dynamic and volumetric calibration of said catching instruments; a further subject of the invention is a method for carrying out such check.

14 Claims, 1 Drawing Sheet

(56) References Cited

U.S. PATENT DOCUMENTS

| | | | | |
|---|---|---|---|---|
| 5,004,025 A * | 4/1991 | Robbins | ............... | E03C 1/30 |
| | | | | 141/364 |
| 5,303,585 A * | 4/1994 | Lichte | ............ | G01F 25/0061 |
| | | | | 367/908 |
| 6,105,418 A * | 8/2000 | Kring | ............... | G01N 15/08 |
| | | | | 73/38 |
| 7,066,021 B1 * | 6/2006 | Noe | ............ | G01W 1/14 |
| | | | | 222/420 |
| 7,509,853 B2 * | 3/2009 | Noe | ............ | G01W 1/14 |
| | | | | 73/170.17 |
| 2006/0191333 A1 * | 8/2006 | Noe | ............ | G01W 1/14 |
| | | | | 73/170.17 |

OTHER PUBLICATIONS

Written Opinion of the International Searching Authority in corresponding PCT application dated Nov. 27, 2012.

Vaclav Kvicera et al.; Dynamic Calibration of Tipping-Bucket Raingauges and Rainfall Intensity Data Processing; Antennas and Propagation, 2006. EUCAP 2006; First European Conference on, IEEE, Piscataway, NJ (Nov. 6, 2006) pp. 1-5.

M.D. Humphrey et al.; A New Method for Automated Dynamic Calibration of Tipping Bucket Rain Gauges; J. of Atmospheric and Oceanic Tech.; Dec. 1997; pp. 1513-1519.

* cited by examiner

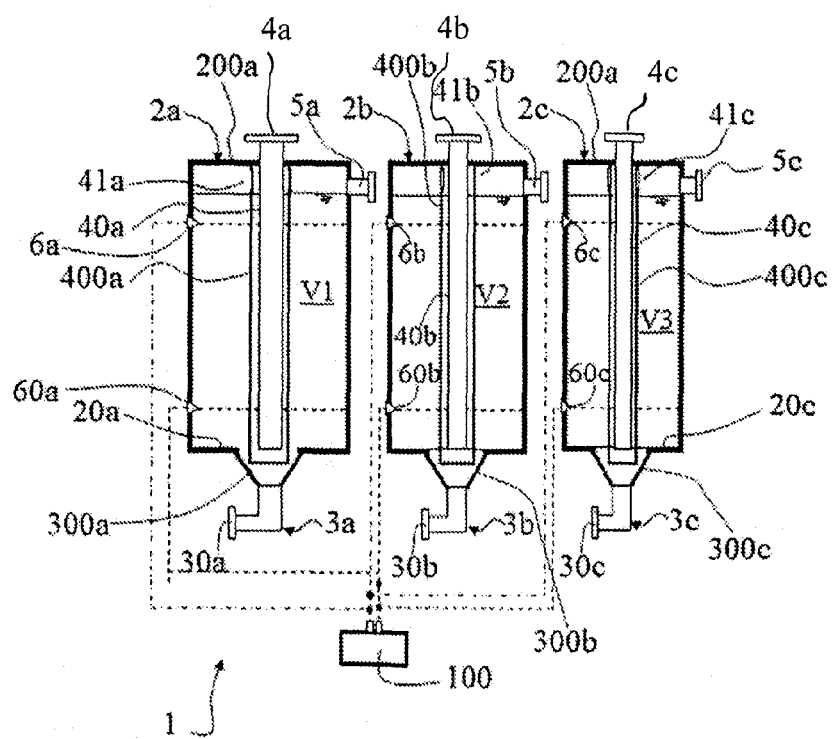

DEVICE FOR CHECKING THE CALIBRATION OF CATCHING INSTRUMENTS MEASURING RAINFALL INTENSITY

TECHNICAL FIELD

The present invention relates to the meteo-hydrological monitoring field and particularly to the calibration of catching instruments measuring the intensity of liquid atmospheric precipitation at the ground (below as rainfall).

The term "instrument measuring rainfall intensity" means that instrument used for measuring the amount (volume or height referred to a unit surface area) of rainfall dropped over a given period of time, usually called by the term "rain gauge". For simplicity reasons in the present description below, this last name will be used for denoting such instruments.

The term "catching" denotes such type of rain gauge provided with an element for collecting and/or conveying the rainfall water towards or into the measuring device. For example the usual tipping-bucket rain gauges (the most widely used in the world), the weighing ones, the drop-counting ones, etc. are catching instruments. Non-catching instruments generally are rain gauges with optical, acoustic, microwave (radar) disdrometer, etc. (today they are mainly used for experimental tests and for scientific research).

Generally, rain gauge instruments require to be periodically subjected to an accurate check of their calibration, such to guarantee measurements made to be reliable and to fall within the narrow accuracy ranges provided by the World Meteorological Organization (W.M.O.) for these instruments.

Calibration conventionally performed for catching type rain gauges is of the volumetric type. Volumetric calibration consists in introducing into the water collector of the rain gauge (funnel) a given volume of water in any interval of time (provided that it is reasonable) and in comparing such introduced volume with the volume actually measured by the rain gauge. Therefore the instrument calibration can be performed, for example in the case of tipping-bucket rain gauge, by changing the nominal capacity of the bucket. The volumetric calibration does not necessarily require the test to be performed under constant flow intensity, and such parameter usually is not checked during the test (generally one works under a variable intensity about a reference value). Rain gauges are always placed in open areas (for example city, rural areas or more in general anywhere it is necessary to detect parameters regarding the atmospheric precipitation). The check of the calibration of a rain gauge in general can be carried out in a laboratory or "in the field", that is without removing the rain gauge from its location. It is clear that the former check, in principle, is usually more accurate since in the laboratory there are more complicated and delicate instruments, that cannot be moved, and they allow to work under known and controlled environmental conditions This type of check however has some drawbacks: it is necessary for an operator to go to the field (where the rain gauge is mounted), to disassemble it, to take it to the laboratory, where the calibration is checked, to move it again and to reassemble it in place. Besides being rather complicated and time-consuming, such type of check subjects the rain gauge also to the risks of being transported twice (from and to the detecting position in the field). It is reminded that, these instruments can be particularly delicate and the risk of damaging them during the transport, or at least of changing the calibration properties is real causing them not to correspond anymore to the calibration check that has been performed. Moreover in the period necessary for performing such operations the rain gauge necessarily does not work, losing data and the continuity of meteo-hydrological observations.

Therefore it is preferable to perform a check "in the field", that provides the operator to go physically to the place where the rain gauge is mounted, taking with him/her a device able to perform such check without the need of disassembling or uninstalling the instrument.

The present invention is particularly useful for this second type of check, that is "in the field", even if nothing prevents it from being used in laboratory.

The calibration check by the present invention applies only to catching type rain gauges equipped with an element for collecting rainfall water (such as for example a funnel or the like).

PRIOR ART

The process known in the prior art for checking in the field the calibration of rain gauges is based only on the volumetric calibration with "single point calibration", that is on checking the measurement error detected at a single precipitation intensity, usually equal to the value of about 50 mm/h for tipping-bucket rain gauges (at such value the error of the rain gauge is usually set at the value stated by the manufacturer in the manufacturing phase).

Moreover, in the checking operations "in the field", a reference constant intensity is not applied but—for operational simplicity reasons—a simple checking device is used wherein a water tank at the bottom is simply provided with a single nozzle with a known diameter.

In such known checking device, however, the intensity is variable with time as a function of the emptying of the tank (the piezometric head changes at the height of the nozzle due to the change of the free surface of the water in the tank during its emptying).

The error of the rain gauge, defined in this manner, therefore relates to an "average" behavior at values close to the calibration point, but they are actually unknown.

A difficulty in interpreting the result and a small reliability of the test derive therefrom.

A completely different type of calibration is that obtained by the device for the dynamic check of rain gauges described in the patent application TO2006A000868 of Jul. 12, 2006 to University of Genoa and developed by the same inventors of the present invention.

The dynamic calibration consists in providing to the rain gauge instrument a sequence of known and constant reference intensities in order to build the error correction curve that is generally variable with the rainfall intensity, even if the rain gauge has been already subjected to the single point calibration.

Even if a volumetric calibration of the rain gauge in the field is desired it is not possible to use the device described in the patent application TO2006A000868, since such device does not allow the liquid volume provided with a constant intensity to the rain gauge under calibration to be accurately checked.

Moreover the instrument described in the patent application TO2006A000868 has to be accurately adapted and re-calibrated each time in laboratory if one desires to operate for checking the calibration of rain gauges which are different from each other as regards surface (diameter) of the catching instrument and sensitivity.

OBJECTS AND SUMMARY OF THE INVENTION

The object of the present invention is to overcome the drawbacks of the prior art.

In particular, the object of the present invention is to provide a device for checking the calibration of catching instruments measuring rainfall intensity that is of simple use, such that it can be advantageously used even by an inexpert operator; moreover an object of the present invention is to provide such a device that contemporaneously checks the dynamic and volumetric calibration, and that has to be easily transportable in the field, such to carry out such check in an easy and relatively quick manner.

The basic idea of the present invention is to arrange a device for checking the calibration of catching instruments measuring rainfall intensity, comprising a plurality of containers having a predetermined internal volume and different from each other, intended to hold respective amounts of a liquid (generally water).

Each container is provided with only one exhaust nozzle for putting the internal volume of the container in fluid communication with the outer environment and for allowing the liquid contained into the container to flow out by gravity.

Advantageously such outflow occurs by causing the liquid to be discharged from the nozzle in a substantially horizontal direction, such to guarantee the absence of effects deforming the output streamline due to the instability of the jet with a consequent non uniformity of the flow (not constant flow rate) which are typical of the configuration with a vertical (or downward) outflow thus preventing it from affecting the check.

Each container further comprises air intake means for defining a compensation of the pressure and consequently of the piezometric head at the nozzle height; such air intake means put the internal volume of the container in fluid communication with the outer environment such to make the piezometric head always constant on the nozzle independently of the change in the liquid level inside said container during the emptying.

With such a device it is possible to contemporaneously perform, in a single test, both a dynamic and volumetric check of the calibration of the rain gauge, therefore avoiding the fact of repeating the operation (once for the dynamic check and another one for the volumetric check).

Moreover the device according to the present invention is advantageously simple to be used and it can be used even by an inexpert operator, since it is sufficient to open a single nozzle and an air intake for each container (one at a time).

It has to be further noted that the device according to the present invention is optimally fit for being used "in the field": the operator can simply fill the several containers before going to the rain gauge and once he/she arrives in the location he/she can perform both the dynamic and the volumetric check in a single operation, without the need of filling again the containers with the liquid, and therefore without the need of bringing with him/her additional tanks or calibrated containers.

In the device according to the present invention a further great advantage is found: the check of the volumetric calibration of a rain gauge is thus performed under a constant intensity.

It is useful here to note that the measurement error of a rain gauge generally changes as a function of the rainfall intensity and so of the flow supplied through the nozzle.

Therefore, by supplying a flow with a constant intensity, a constant error of the rain gauge is obtained during the test, with the advantage of obtaining a very accurate check, which occurs, remind, contemporaneously with the dynamic check.

Further advantages of the present invention relate to the fact that it is possible to arrange a variable plurality of independent containers, one for each single desired intensity, therefore having a great application versatility for the plurality of manufacturing properties of the rain gauges marketed nowadays (diameter or surface of the catching element and sensitivity of the instrument).

Therefore a first subject of the present invention is a device for performing such check of the calibration and a second subject of the present invention is a method for carrying out such check.

BRIEF DESCRIPTION OF THE DRAWINGS

The invention will be described below with reference to non-limiting examples, provided by way of example and not as a limitation in the single annexed FIGURE that is a base version of a device according to the present invention.

DETAILED DESCRIPTION OF THE INVENTION

While the invention is susceptible of various modifications and alternative forms, one simplified embodiment is shown in the drawing and will be described below in detail.

It should be understood, however, that there is no intention to limit the invention to the specific embodiment disclosed, but, on the contrary, the intention of the invention is to cover all modifications, alternative forms, and equivalents falling within the scope of the invention as defined in the claims.

In the following description the use of "for example", "etc", "or" indicates non-exclusive alternatives without limitation unless otherwise noted. The use of "including" means "including, but not limited to," unless otherwise noted.

Moreover, in the description, the terms "horizontal" and "vertical" and/or the terms "lower" and "upper" are to be intended as referred to an operational mounting (or operating) condition of the device.

FIG. 1 shows a basic example of a device 1 for checking the calibration of catching instruments measuring rainfall intensity, so called rain gauges (not shown).

In this example, the device 1 comprises three containers 2a, 2b, 2c having a predetermined internal volume V1, V2, V3 intended to contain respective amounts of a liquid, for example water.

The three volumes V1, V2 and V3 of the three containers 2a, 2b, 2c are known beforehand and they can be different from each other. For example, reference values for a tipping-bucket rain gauge with an area of the catching element of 1000 cm$^2$ and a nominal volume equal to 20 cc can range from 2 liters for intensity of 300 mm/h to about 1 liter for intensity equal to 20 mm/h.

Obviously it should be noted now that it is possible to provide two, four, five or more containers instead of three containers without departing from the teaching provided herein.

Each container 2a, 2b, 2c comprises a bottom wall 20a, 20b, 20c and an upper wall 200a, 200b, 200c a preferably, but not exclusively, cylindrical shell wall extending therebetween.

Each container 2a, 2b, 2c is hermetically sealable.

Each container 2a, 2b, 2c is provided with a single exhaust nozzle 3a, 3b, 3c intended to put in fluid communication its internal volume V1, V2, V3 with the outer environment in order to allow the liquid contained therein to flow out by gravity.

To this end, at the bottom of each container 2a,2b,2c there is provided a single nozzle 3a, 3b, 3c; the section of the outlet orifice 30a, 30b, 30c of each nozzle 3a, 3b, 3c of a container will be equal to or different than that of the nozzles of the other containers depending on needs.

The outlet section of each nozzle 3a,3b,3c is controlled by a valve, tap or the like (not shown) such to allow the nozzle 3a,3b,3c to be hermetically opened or closed.

The section of each nozzle is sized with respect to the piezometric head generated thereon in the container (kept as constant during the test) and which is essentially equal to the distance between the end section of the nozzle and the lower section of the air intake inner tube of the container as described below.

In this example the nozzles 3a,3b,3c are made of pieces of pipe connected to the bottom wall 20a, 20b, 20c of each container 2a, 2b, 2c and are elbow shaped with a bending angle of about 90°.

To this end each nozzle 3a, 3b, 3c has a first vertical pipe portion connected to the horizontal bottom 20a, 20b, 20c of the respective container 2a, 2b, 2c and a second horizontal pipe portion at which end the outlet orifice 30a, 30b, 30c is located, therefore opening with a vertical section, that is laying in a plane orthogonal to that corresponding to the free surface of the liquid, when it is into the container.

Thus the flow of liquid flows out from the nozzle 3a, 3b, 3c in a substantially horizontal direction.

It has to be noted that upstream of the vertical pipe portion (that is between the vertical pipe and the horizontal bottom 20a, 20b, 20c), each nozzle 3a, 3b,3c, in the example, comprises a truncated cone connecting portion connecting the vertical pipe portion having a constant diameter with the horizontal bottom 20a, 20b, 20c.

This solution proves to be particularly useful since it makes it possible to reduce to less than 1% the share of volume that is discharged with a not strictly constant intensity, a value that is very lower than the accuracy ranges of calibration devices for catching type rain gauges adopted by W. M. O. (±1.5%).

The term "discharge in a substantially horizontal direction" in this description and in the claims below means that in the discharging streamline the velocity vectors of the water have a strictly horizontal direction at the last physical section of the nozzle.

Such flow condition guarantees the fact of avoiding possible perturbations of the streamline (typical of instability phenomena of the arrangement with a vertical discharge) that would affect both the dynamic and the volumetric check by not guaranteeing the discharged fluid flow rate to be strictly constant.

An equivalent solution (not shown) on the contrary provides the nozzles 3a,3b,3c to be composed of only one short portion of horizontal pipe connected on one of the vertical (or shell) walls of the respective container 2a,2b,2c, at the end of such pipe the respective outlet orifice opens, such to cause anyway the liquid to flow out in a substantially horizontal direction, as defined above and for the same reasons.

Each container 2a,2b,2c then comprises air intake means 4a,4b,4c intended to put its internal volume V1, V2, V3 in fluid communication with the outer environment in order to define a compensation of the air pressure in the volume portion occupied thereby and consequently a compensation of the piezometric head at the nozzle 3a,3b,3c.

Thus the piezometric head acting on each nozzle 3a,3b,3c is advantageously made constant independently of the change of the liquid level in said container 2a,2b,2c upon its emptying and thus it is possible to perform a dynamic or volumetric check under a constant flow intensity.

In this example the air intake means 4a,4b,4c comprise two concentric tubes both with preferably coinciding vertical axis and preferably (but not exclusively) a circular cross-section. A first inner tube 40a,40b,40c is put in direct connection with the outer atmosphere as described below, while a second outer tube 400a,400b,400c operates as a calming channel or reservoir for reducing the agitation of the free surface of the liquid inside the container due to air bubbles entering the fluid mass.

Each inner tube 40a,40b,40c passes through the upper wall of the respective container, to pass outside and it is closed by an air-tight cap, and it extends up to an height, with respect to the outlet section of the container nozzle, corresponding to the water head which is desired to be set such to obtain a specific constant output flow rate.

Each outer tube 400a,400b,400c extends, from the upper wall of the container 2a,2b,2c, inside it for a length greater than the inner tube, such to end further down, however remaining at a given distance from the bottom of the container.

In its upper portion, near the upper wall 200a,200b,200c of the container each outer tube 400a,400b,400c is then open with one or more radial apertures 41a,41b,41c, that put the internal volume of the tube 400a,400b,400c in communication with the volume V1,V2,V3 of the respective container 2a,2b,2c such to allow the input air to be completely mixed with the one already inside the container.

It has to be noted that each inner tube 40a,40b,40c extends substantially up to the bottom 20a,20b,20c of the respective container, while the outer tube 400a,400b,400c extends beyond it, till coming out into the truncated cone portion of the corresponding nozzle, that is under the bottom 20a,20b, 20c.

This arrangement serves for limiting the oscillations caused by the air bubbles entering the liquid mass inside the container, such that such oscillations do not affect the detection by the sensors (defined below) that measure the transit time of the free surface of the water upon the emptying.

The physical principle that allows a constant pressure to be kept at the nozzle height is easily deduced from the following:

when a container 2a,2b,2c is filled and then turned upside down in the operating position, in the upper portion not occupied by the water a pressure $p_0$ lower than the atmospheric pressure $p_{atm}$ is generated such to balance—in any moment—the hydrostatic head $\gamma h$ at the height of the outlet nozzle, where $p_{atm} = \gamma h + p_0$ and $\gamma$ is the specific weight of the water and h is the total level of the water.

Upon reaching the balance, the water does not come out from the container even if the nozzle 3a,3b,3c is opened.

When the air intake on the outer (upper) portion of the tube 40a,40b,40c is opened the pressure at the height of the end section of the tube becomes equal to the atmospheric pressure $p_{atm}$ and it exceeds the inner pressure at such height, that is equal to $p_0+\gamma h^*$ ($h^*$ is the difference of height between the water surface in the container and the height of the inner air intake).

This allows air—in the form of bubbles—to enter the container and which increases the pressure $p_0$ (that of the air in the upper portion of the container not occupied by the water).

Now the pressure at the height of the nozzle is not balanced anymore and $p_0+\gamma h>p_{atm}$ occurs.

This causes water to flow out from the nozzle reducing the water volume inside the container, thus reducing the height and the hydrostatic pressure $\gamma h$.

Water should not go out anymore, but if the air intake remains open the process goes on over time, repeating the previous steps, till emptying the container.

During the emptying process the entry of air and the discharge of water are balanced keeping the pressure at the nozzle height constant, which will be equal to:

$$\gamma(h-h^*)+p_0(t)+\gamma h^*(t)=\text{const}$$

$p_0(t)$=air pressure inside the container that progressively increases due to the air flowing in from the outside (bubbles)

$\gamma h^*(t)$=water pressure that progressively decreases as the container is emptied The output flow rate depends only on the total pressure at the nozzle height and it remains constant since the pressure remains constant: $Q=\zeta(h-h^*)^{1/2}$ The coefficient $\zeta$—that incorporates different contributions—is constant over time and it is defined by measuring the emptying time (level sensors).

Each container 2a,2b,2c is then provided with an overflow pipe 5a,5b,5c which opens at one of the shell walls thereof and it goes out in the outer environment; such overflow pipe 5a,5b,5c is also provided with an air-tight cap.

It has to be noted that the radial apertures 41a,41b,41c preferably open at an height higher than the one where the overflow pipe 5a,5b,5c opens, such that, by filling the container 2a,2b,2c with a liquid (with the cap of the overflow pipe in the opened condition), the maximum level that can be reached by the free surface of the liquid is not such to reach the height of the radial apertures 41a,41b,41c.

Thus these latter apertures, in the operating condition, (with the cap of the overflow pipe tightly closed and with the cap of the air intake inner tube opened), remain always out of the liquid of the container.

The device 1 further comprises, for each container 2a,2b,2c even a level transit sensor, intended to detect the passage of the free surface of the liquid at least at two specific heights.

In the example of FIG. 1 the sensor comprises, for each container 2a,2b,2c, a pair of sensors, an upper one 6a,6b,6c and a lower one 60a,60b e 60c.

In particular the upper sensor 6a,6b,6c is located at an height lower than that reached by the liquid in the container at the overflow 5a,5b,5c, while the lower sensor is located higher than the lower end of the inner tube of the air intake.

As regards the sensors 6a,6b,6c,60a,60b,60c, it has to be noted that they can be optical, mechanical, induction, capacitive ones etc.

Each sensor 6a,6b,6c,60a,60b,60c is connected by an electric cable or a data line (shown with a dash-point line) to a control unit 100 comprising at least a timer and it is able to measure the time necessary for the transit of the free surface of the liquid between the two sensors in each container 2a,2b,2c.

The operation of the device 1 described up to now is as follows: the device 1 is placed on a horizontal plane and the cap of each overflow pipe 5a,5b,5c is removed.

The corresponding container 2a,2b,2c is filled with water till it flows out from the overflow 5a,5b,5c.

Thus, by knowing at which height the overflow is located with respect to the bottom 20a,20b,20c and by knowing the plan measurements of the container 2a,2b,2c it is possible to exactly accurately know the water volume contained therein.

Therefore the air-tight cap of the overflow 5a,5b,5c is closed and by keeping tightly closed even the cap of the inner tube 40a,40b,40c, and the tap of the outlet nozzle 3a,3b,3c, the device 1 can be transported to the place of installation of the rain gauge whose calibration has to be checked, without the risk of affecting the water volume of each container 2a,2b,2c due to leakages or the like.

Then the operator goes on by interfacing the device 1 with the rain gauge, paying attention to place the device 1 on a horizontal plane, and he/she acts on one of the container 2a or 2b or 2c, depending on which intensity he/she desires to check first.

Therefore the tap of the nozzle 3a,3b,3c and even the cap of the air intake inner tube 40a,40b,40c of the selected container is opened, thus the water contained therein flows out.

Therefore the water begins to flow out by gravity from the corresponding nozzle and consequently its free surface goes down, going beyond the upper sensor 6a or 6b or 6c, depending on the container he/she is operating on.

When the free surface of the water passes at said upper sensor the control unit 100 starts to count the elapsed time.

When the container continues to empty, the free surface of the water inside it continues to go down, till meeting the lower sensor 60a or 60b or 60c, once reaching it the timer stops to count the elapsed time.

The ratio of the known volume of liquid placed inside the container to the emptying time measured by the control unit immediately gives the intensity of the hydric fluid flowed into the instrument, which is constant due to the continuous balance of the pressures operated by the device during the test. The comparison between such flow intensity and the value measured by the instrument during the several minutes of the length of the test gives for each container a point of the dynamic calibration curve of the rain gauge. Contemporaneously, the comparison of the liquid volume placed in the container and the volume of rainfall measured by the instrument gives the volumetric calibration of the rain gauge, advantageously performed under constant flow intensity.

Thus the objects of the present invention are obtained.

Then obviously several variants to what described up to now are possible, all of them to be intended as an integral part of the present invention.

The invention claimed is:

1. Device (1) for checking the calibration of catching instruments measuring rainfall intensity, characterized in that it comprises a plurality of containers (2a, 2b, 2c) having a predetermined internal volume (V1, V2, V3), the volume of at least two of said containers being different from each other, said containers being adapted to contain respective amounts of a liquid, wherein each container (2a, 2b, 2c) is provided with a single exhaust nozzle (3a, 3b, 3c) adapted to put the internal volume (V1, V2, V3) of said container (2a, 2b, 2c) in fluid communication with an outer environment such to allow said liquid when discharged from said nozzle (3a, 3b, 3c) to flow out by gravity in a substantially horizontal direction, each one of said containers (2a, 2b, 2c)

further comprising air intake means (4a, 4b, 4c) adapted to put the internal volume (V1, V2, V3) in fluid communication with the outer environment in order to adjust the air pressure inside the container, to keep a piezometric head constant at the height of said nozzle (3a, 3b, 3c) independently of the change of the liquid level in said container (2a, 2b, 2c) during its emptying, in order to obtain a contemporaneous check of the dynamic and volumetric calibration of said catching instruments.

2. Device (1) according to claim 1, wherein all the containers (2a, 2b, 2c) have an internal volume (V1, V2, V3) different from each other.

3. Device (1) according to claim 1, wherein each container (2a, 2b, 2c) comprises a bottom wall (20a, 20b, 20c) and an upper wall (200a, 200b, 200c) a preferably cylindrical shell wall extending therebetween, to which an overflow pipe (5a, 5b, 5c) is connected openable towards an environment outside said device (1).

4. Device (1) according to claim 1, wherein each container (2a, 2b, 2c) is hermetically sealable.

5. Device (1) according to claim 1, wherein said nozzles direct a liquid flow that discharges in a substantially horizontal direction.

6. Device (1) according to claim 1, in which each nozzle (3a, 3b, 3c) has an outlet orifice (30a, 30b, 30c), each outlet orifice (30a, 30b, 30c) having an outlet section different than the outlet section of other outlet orifices (30a, 30b, 30c).

7. Device (1) according to claim 1, wherein said nozzles (3a, 3b, 3c) are made of pieces of pipe connected to said bottom wall (20a, 20b, 20c) of each container (2a, 2b, 2c) and they are elbow shaped with a bending angle of about 90°.

8. Device (1) according to claim 1, wherein each air intake means (4a, 4b, 4c) comprises: a first tube (40a, 40b, 40c), sealable by an air-tight cap or the like, and intended to be selectively placed in direct connection with an environment outside said container and a second outer tube (400a, 400b, 400c) intended to operate as a calming reservoir for limiting the agitation of the free surface of the liquid inside said container, said first tube (40a, 40b, 40c) and said second tube (400a, 400b, 400c) being concentric and wherein in one upper portion thereof each second tube (400a, 400a, 400a) is opened with one or more radial apertures (41a, 41b, 41c) that put an internal volume of the second tube (400a, 400b, 400c) in communication with said volume (V1, V2, V3) of the respective container (2a, 2b, 2c).

9. Device (1) according to claim 8, wherein said radial apertures (41a, 41b, 41c) are at a height higher than a height where an overflow pipe (5a, 5b, 5c) opens.

10. Device (1) according to claim 8, wherein the length of the first tube is fixed or adjustable in order to obtain a desired hydraulic head over the outlet section of said exhaust nozzle, so as to generate a desired flow rate at the outlet.

11. Device (1) according to claim 1, comprising for each container (2a, 2b, 2c) a transit level sensor, intended to detect the passage of a free surface of a liquid at least at two different heights and a control unit (100) that comprises a timer for measuring the time for the passage of said free surface of the liquid between said two different heights.

12. Method for checking the calibration of catching instruments measuring rainfall intensity, characterized in that it comprises a contemporaneous check of the dynamic and volumetric calibration of said catching instruments when calibrating said catching instruments by the application of the device of claim 1.

13. Device (1) for checking the calibration of catching instruments measuring rainfall intensity, characterized in that it comprises a plurality of containers (2a, 2b, 2c) having a predetermined internal volume (V1, V2, V3), the volume of at least two of said containers being different from each other, said containers being intended to contain respective amounts of a liquid, wherein each container (2a, 2b, 2c) is provided with a single exhaust nozzle (3a, 3b, 3c) intended to put the internal volume (V1, V2, V3) of said container (2a, 2b, 2c) in fluid communication with an outer environment such to allow said liquid when discharged from said nozzle (3a, 3b, 3c) to flow out by gravity in a substantially horizontal direction, each one of said containers (2a, 2b, 2c) further comprising air intake means (4a, 4b, 4c) intended to put the internal volume (V1, V2, V3) in fluid communication with the outer environment in order to define a compensation of the air pressure inside the container, to keep a piezometric head constant at the height of said nozzle (3a, 3b, 3c) independently of the change of the liquid level in said container (2a, 2b, 2c) during its emptying, such to obtain a contemporaneous check of the dynamic and volumetric calibration of said catching instruments, wherein each air intake means (4a, 4b, 4c) comprises: a first tube (40a, 40b, 40c), sealable by an air-tight cap or the like, and intended to be selectively placed in direct connection with an environment outside said container and a second outer tube (400a, 400b, 400c) intended to operate as a calming reservoir for limiting the agitation of the free surface of the liquid inside said container, said first tube (40a, 40b, 40c) and said second tube (400a, 400b, 400c) being concentric and wherein in one upper portion thereof each second tube (400a, 400a, 400a) is opened with one or more radial apertures (41a, 41b, 41c) that put an internal volume of the second tube (400a, 400b, 400c) in communication with said volume (V1, V2, V3) of the respective container (2a, 2b, 2c).

14. Device (1) according to claim 13, wherein said radial apertures (41a, 41b, 41c) are at a height higher than the one where an overflow pipe (5a, 5b, 5c) opens.

* * * * *